UNITED STATES PATENT OFFICE.

ROBERT A. FISHER, OF PHILADELPHIA, PENNSYLVANIA.

NEUTRAL SIZING MATERIAL FOR PAPER-MAKERS' USE.

SPECIFICATION forming part of Letters Patent No. 321,093, dated June 30, 1885.

Application filed March 25, 1885. (No specimens.)

*To all whom it may concern:*

Be it known that I, ROBERT A. FISHER, of the city and county of Philadelphia, State of Pennsylvania, have invented a new and improved process for producing directly from bauxite, kaolin, or any other of the commonly-employed alum-clays containing ferrous or ferric oxide, or both, a white sizing material for paper-makers' use, containing the sulphates of alumina and zinc or magnesia, and ferrous sulphate, but free from ferric sulphate, and so "neutral" that a moderately dilute solution of the material produces but little or no effect upon the ultramarine-blue and other pigments used in coloring paper-pulp.

The following description will enable any one skilled in the art to which my invention most nearly appertains to carry it into practice.

The first step in my process is to prepare a solution of sulphate of alumina containing iron. The bauxite, kaolin, or other ferro-aluminous material to be used is to be treated with sulphuric acid after the method generally followed for the particular aluminous mineral or alum-clay that is to be used. When the chemical action is ended, the liquor is run off into vats and the insoluble matter removed either by subsidence or other means. The clear liquid thus obtained, if made from an aluminous material containing ferric oxide, will be of a yellow or brown color, and will not produce the white porous substance which is the object of my invention, but a body of an objectionable buff or brown color. Therefore, the ferric sulphate contained in the liquid must be converted into ferrous sulphate. This can be accomplished by using any suitable "reducing agent," be it a solid or a liquid or gas set free directly in the liquid or previously generated and subsequently passed into the liquid, sulphureted hydrogen gas, sulphurous acid in the gaseous or liquid condition, or certain sulphides or hyposulphites, or zinc or lead in the metallic condition may be used; but I prefer to use metallic zinc. The solution of sulphate of alumina containing ferric sulphate either hot or cold (heat expedites the process) is to be submitted to the action of zinc in the form of dust, scrap-zinc, or feathered "spelter" or other form. A convenient method is to place the zinc in one or more wicker baskets submerged in the liquid. The time required and the amount of zinc necessary will depend upon the amount of ferric oxide present in the liquid. Two (2) pounds of zinc to one hundred pounds of the white porous substance to be produced may be more than enough; but sufficient zinc (or other reducing agent) must be used to convert the ferric sulphate present in the solution to ferrous sulphate.

To carry out my invention it is not necessary to delay the reduction of the ferric sulphate to ferrous sulphate until a clear ferruginous solution of sulphate of alumina has been obtained. The said reduction may be commenced in the "attacking-vat" soon after the chemical reaction between the bauxite or other alum-clay has begun or at any time subsequently; and should this method be preferred the reducing agent may be brought into contact with the muddled liquor either in the attacking-vat or the receptacle into which the liquor may have been transferred; but I prefer to delay the reduction of the ferric sulphate to ferrous sulphate until after the chemical reaction between the alum-clay and sulphuric acid shall have been completed, and subsequent to removal of insoluble matter from the solution.

The next step in my process is to render the solution "neutral" or slightly "basic," so that it will not affect the color of the ultramarine-blue used in coloring paper-pulp. For this purpose I use either oxide of zinc or of magnesium, or the carbonates or bicarbonates of these metals. To the clear ferro-aluminous solution (of density 26° Baumé, more or less, but the degree of concentration within certain limits is not of much importance) I add the oxide of zinc or other neutralizing material, (either in its dry state or mixed with water,) and stir till all, or nearly all, of the neutralizing material has been dissolved. The temperature at which the neutralizing material is to be introduced into the ferro-aluminous solution is immaterial; but I prefer to use a hot or boiling solution.

The amount of material required to produce a neutral or slightly basic solution of sulphate of alumina—that is to say, a solution which will not affect the color of ultramarine-blue—will depend upon the amount of free acid present. In some cases two (2) pounds of the neutralizing material to one hundred pounds of the white porous substance to be produced might more than suffice. A much larger quantity might be required should the ferro-aluminous solution contain much free acid.

It is not necessary that the ferro-aluminous solution should be "clear"—that is to say, free from silica and other insoluble matter—before introducing the neutralizing material. The same may be used at any time after the chemical reaction of the sulphuric acid and aluminous material has ceased, while the solution is still muddled with insoluble matter; but I prefer to add the neutralizing material to a clear solution highly or but moderately concentrated, as the solution may happen to be.

To determine whether enough of the neutralizing material has been used, I filter off a small portion of the ferro-aluminous solution treated as above, cool it, (if the solution be hot,) then put it into a bottle, and add a few grains of the best ultramarine-blue used by paper-makers. Shake up the contents of the bottle frequently, and if, after the lapse of an hour, (more or less,) the color of the ultramarine-blue has not been affected, the solution may be regarded as neutral, and further addition of the neutralizing material is not required. If, on the contrary, the color of the ultramarine-blue has been altered, more of the neutralizing material must be added to the ferro-aluminous liquid, and after agitating the same must be again tested with ultramarine-blue, as before. These alternate operations of adding the neutralizing material and testing the resulting liquid with ultramarine-blue must be repeated till the filtered solution fails to affect the color of ultramarine-blue, even after many hours' contact.

I do not confine myself to the use of an oxide or other compound of zinc or magnesium. The neutralization of the free acid of the ferro-aluminous solution can be accomplished by the use of an alkali, or an alkaline earth or carbonate or bicarbonate of the same, or of certain metallic salts other than compounds of zinc or magnesium; but I prefer to use a compound of zinc or magnesium, because the use of such compound does not diminish the so-called "sizing-power" of my final product, while the effect of alkalies and all alkaline earths, except magnesia and certain metallic bases, diminish the said sizing-power.

By the term "sizing-power," as applied relatively to aluminous cake, alum, or any other sizing material used by paper-makers, I understand the relative quantities of such sizing material required to precipitate or "neutralize" a given quantity of the "rosin-size" used in the "sizing-engine." The greater the sizing-power of any "sizing material" the less of it will be required to do its work.

The next step in my process is to convert the neutral or slightly basic solution into lumps of a porous or vesicular structure. This can be conveniently accomplished as follows, viz: If the solution be free from insoluble matter, concentration can at once proceed; but if not, it must be cleared by subsidence or filtration or use of the filter-press. The clear neutral or slightly basic solution is then to be concentrated in a suitable apparatus to 65° Baumé, more or less. Then it is to be cooled with or without stirring until it becomes viscid. Then I sprinkle upon the viscid mass bicarbonate of soda in fine powder, (in the proportion of two (2) pounds, more or less, to one thousand pounds of the white porous substance to be produced,) stir the bicarbonate of soda rapidly into the mass, which, when thoroughly mixed and sufficiently cool, must be discharged into a suitable receptacle to harden. When sufficiently cool, the mass must be broken up into lumps of the desired size.

The porous or vesicular structure may be produced by adding to the hot viscid mass aforesaid a small quantity of bicarbonate of soda, potassa, lime, or other alkali or alkaline earth, or the bicarbonate or carbonate of some other base, or by any sulphide, sulphite, or other compound which will set free an acid vapor or gas, so that the same in the act of escaping will inflate the mass and render it frothy while in the process of cooling and hardening, and whereby it becomes full of pores or vesicules. A like result, though less perfect in its operation, may be obtained by the rapid injection of air, steam, vapor of water, or any gaseous body into the hot viscid mass, the object being the production of the porous or vesicular condition of the mass when in the act of cooling and hardening.

I am aware that Henry Pemberton, of Allegheny City, Pennsylvania, has patented a process (No. 82,747) for producing pores or vesicles in pure sulphate of alumina.

I am also aware that Carl V. Petraeus has patented a process (No. 269,957) for producing pores or vesicles in a hot viscid acid mass of sulphate of alumina by the use of carbonate of zinc.

I am, moreover, aware that Conrad Semper has patented (No. 280,088) a process to produce a neutral "sulphate of alumina containing magnesia by treating a hot (acid) solution of sulphate of alumina with carbonate or bicarbonate of magnesia."

Letters Patent No. 223,443 have been granted to myself for producing an aluminous cake containing zinc and iron by the use of oxide of zinc to neutralize free acid; but this invention was to produce a cake that was to be "broken up into pieces and dried either by prolonged exposure to the air at ordinary temperatures or more rapidly by artificial heat, and finally ground in a mill of any suitable construction."

The invention for which I now desire to secure Letters Patent avoids the expense of drying by long exposure to the air or artificial heat, and enables me in less than an hour after the solution is sufficiently concentrated to produce at considerably less expense a merchantable article of superior quality on account of its porous or vesicular structure.

Having thus described my invention, what I claim as new, and desire to secure by Letters Patent, is—

1. The process described of manufacturing a white porous material for paper-makers' use, containing sulphate of alumina, sulphate of zinc, and ferrous sulphate, and so neutral that it does not affect the color of artificial ultramarine-blue, substantially as herein set forth.

2. The process herein described of producing directly from any aluminous substance containing iron a white porous sizing material for paper-makers' use, which contains both zinc and iron and is so neutral that it does not affect the color of artificial ultramarine-blue, substantially as herein set forth.

3. The process herein described of producing from any aluminous material containing iron a white porous sizing material for paper-makers' use, which consists, essentially, in first preparing a solution of sulphate of alumina containing iron, next reducing ferric sulphate to ferrous sulphate, next making such solution neutral or slightly basic by the use of oxide of zinc or other suitable neutralizing material, then if any insoluble matter be present removing the same to obtain a clear solution, then concentrating the clear solution, if not already sufficiently concentrated to 65° Baumé, (more or less,) then adding bicarbonate of soda to the hot viscid mass, and, finally, after the mass shall have sufficiently cooled to break it into lumps of the desired size.

ROBERT A. FISHER.

Witnesses:
MATT. CLIFTON,
WM. G. LITTLETON.